United States Patent [19]
Pritchard

[11] Patent Number: 4,828,943
[45] Date of Patent: May 9, 1989

[54] BATTERY HAVING INDICIA FOR CORRECTING SPECIFIC GRAVITY DETERMINATION AT VARYING ELECTROLYTE LEVELS

[75] Inventor: Sue P. Pritchard, Birmingham, Ala.
[73] Assignee: Southern Company Services, Inc., Atlanta, Ga.
[21] Appl. No.: 115,814
[22] Filed: Nov. 2, 1987
[51] Int. Cl.⁴ ............................................. H01M 10/48
[52] U.S. Cl. ...................................... 429/91; 73/32 R
[58] Field of Search ...................... 429/91, 90; 73/1 H, 73/32 R, 443, 306; 116/227

[56] References Cited

U.S. PATENT DOCUMENTS 1,136,789  4/1915  Fritchle ................................. 429/91
4,192,909  3/1980  McElroy ............................... 429/91

FOREIGN PATENT DOCUMENTS 0235118  3/1967  U.S.S.R. ............................... 429/91

Primary Examiner—Donald L. Walton
Attorney, Agent, or Firm—Needle & Rosenberg

[57] ABSTRACT

A battery which facilitates the measurement and recording of data is provided. The battery has a transparent casing wall and a scale attached to the wall for measuring the level of electrolyte within the battery. The scale contains first measuring indicia for measuring the distance the electrolyte level falls below a high level mark, and second indicia aligned literally opposite and having values, for example, specific gravity value correction factors, correlating to those of the first indicia.

4 Claims, 1 Drawing Sheet

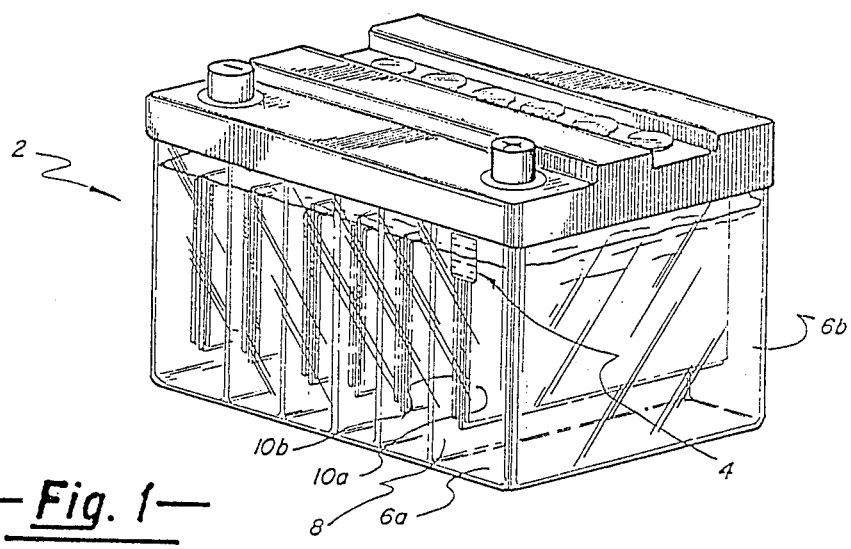
_Fig. 1_
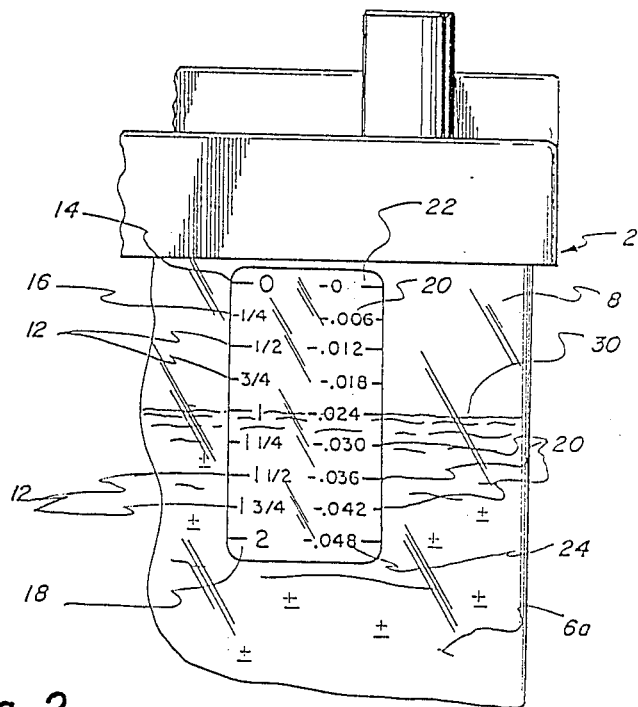
_Fig. 2_

BATTERY HAVING INDICIA FOR CORRECTING SPECIFIC GRAVITY DETERMINATION AT VARYING ELECTROLYTE LEVELS

BACKGROUND OF THE INVENTION

The present invention relates to batteries, and in particular, discloses batteries having indicia for measuring electrolyte levels and for determining a specific gravity correction factor for such electrolyte.

The typical lead storage battery includes a battery case which houses electrodes and electrolytes. An electrolyte is a substance in solution capable of conducting an electrical current. One common electrolyte is dilute sulfuric acid. Evaporation of water inside the battery results in a lowering of electrolyte level, and a corresponding increase in the specific gravity of the electrolyte. Addition of water to the battery to maintain electrolyte level within predetermined limits results in a raising of electrolyte level and a corresponding decrease in the specific gravity of the electrolyte. The specific gravity of the electrolyte is a good indicator of the charge of the battery. A low specific gravity may indicate an insufficiently charged battery.

"Trending" is a common practice in many factories and plants which use batteries. This procedure is used to provide an indication of battery life by comparing specific gravity readings taken over a period of time. Since specific gravity varies with the level of electrolyte within the battery, in order to properly compare like quantities over time, specific gravity readings are corrected to a predetermined reference electrolyte level. Any water additions to the battery in compensation for evaporation are made to maintain the electrolyte level at or below the reference level. A first specific gravity reading is taken with a hydrometer and the level of the electrolyte with respect to the predetermined reference level is noted while the battery is fully charged. The specific gravity reading is corrected by subtracting from the reading a predetermined specific gravity correction factor corresponding to the distance between the electrolyte level and the predetermined reference level. At predetermined intervals thereafter, additional hydrometer readings are taken. Each subsequent specific gravity reading must be corrected in the same manner as the first specific gravity reading. In this manner, proper comparisons between initial and subsequent specific gravity readings can be made.

Currently, the specific gravity correction factor is derived by manually measuring the distance between the initial electrolyte level and the level at the time of reading. This is commonly done using a conventional ruler. The specific gravity correction factor is then calculated, using the distance derived, according to manufacturer's specifications or by reference to consulting tables. Such calculations or references, however, are both time consuming and may introduce inaccuracies. For example, in a large power plant, there may be thousands of batteries for which readings must be taken. Additionally, each battery may consist of a number of cells which may require individual readings. The current procedure of taking manual readings and determining the correction factor is, therefore, burdensome and expensive.

There exists, therefore, a need for a battery which enables quick, accurate and economical reading of electrolyte level.

There also exists a need for a battery which permits quick and accurate calculation of a specific gravity correction factor.

Furthermore, there exists a need for such a battery which allows for the reading of electrolyte level and the determination of the specific gravity correction factor, but which is simple in design and inexpensive to produce.

SUMMARY OF THE INVENTION

The present invention relates to a battery having indicia for measuring electrolyte level and for determining the specific gravity correction factor.

A permanently affixed scale is provided on a transparent wall of a battery case. The point on the scale indicating the electrolyte level corresponds to the reference electrolyte level. In addition, the specific gravity correction factor for a number of electrolyte levels are calculated in advance and indicated laterally adjacent to the corresponding electrolyte level graduation. This allows the correction factor to be immediately available for recording upon observation of the electrolyte level and eliminates the risk of error during mathematical calculation.

Therefore, a specific gravity reading taken by a hydrometer may be adjusted by the correction factor to give an accurate value for the specific gravity of the electrolyte. Such will allow for any comparison and trending of specific gravity readings taken over a period of time, without resort to consulting tables or time consuming calculations, and without having to manually measure electrolyte levels.

Therefore, it is an object of the present invention to provide a battery which allows for quick, accurate and economical reading of electrolyte level.

It is a further object of the present invention to provide a battery which allows for quick, accurate and economical determination of the specific gravity correction factor for a given electrolyte level.

It is a still further object of this invention to eliminate the need for manual measurement of the electrolyte level.

These and other objects and advantages will appear from the following description with reference to the drawings.

BRIEF DESCRIPTION OF THE DRAWINGS

FIG. 1 shows a prospective view of a battery having a scale on one cell.

FIG. 2 shows a portion of a battery having the scale of the present invention.

DESCRIPTION OF THE PREFERRED EMBODIMENT

The preferred embodiment is now described with reference to the drawings, in which like numbers indicate like parts throughout the views.

Referring to FIGS. 1 and 2, a storage battery 2 is shown. The battery 2 has a plurality of casing walls 6a, b, and c, including at least one transparent vertical wall 6a, defining a storage cell 8. The transparent wall should be such as to allow the level of electrolyte within the battery to be observed. For purposes of the invention, the term "transparent" will be defined to include properties which can be considered "translucent" or otherwise allowing the level of the electrolyte to be observed through the wall, and such definition is intended throughout the application. The storage cell 8 contains an electrolyte, which is a substance in solution capable of conducting an electrical current, and positive and negative electrodes 10, which are immersed in the electrolyte.

The chemical processes involved during discharge of a battery result in a decrease in the specific gravity of the electrolyte of that battery. Also, evaporation causes a decrease in electrolyte level within the battery 2, which is seen as a lowering of the electrolyte surface line 30 through the transparent wall 6a. A correlation exists between electrolyte level and specific gravity, and if the first is known, the latter is calculable by adding or subtracting a specific gravity correction factor from a predetermined base specific gravity reading. The transparent casing wall 6a allows the electrolyte level to be observed during measurement.

Referring to FIG. 2, a scale 4 is provided on the transparent wall 6a for measuring the electrolyte level within the cell 8. The scale 4 is provided along its opposite longitudinal edges with linear measuring indicia 12 and 20.

First linear measuring indicia 12 are provided for measuring and quantifying the distance from the high electrolyte level mark 14, to the given electrolyte level at the time of measurement. The scale 4 may be graduated in one-quarter inch intervals as at 16 and in descending order from the high level mark 14 of zero at the top of the scale 4, to the low electrolyte level mark 18 at the bottom, as shown. These numbers may be printed on a sticker and placed on the battery wall 6a, or may be embossed directly on the wall 6a.

Additionally, second linear measuring indicia 20 are provided along the edge opposite the first indicia 12 indicating the correction factor for the specific gravity at a given electrolyte level.

The second indicia 20 appear in descending order so as to be laterally aligned on the scale 4 with first indicia 12 indicating a correlating distance. Therefore, the high electrolyte level mark 14 is aligned with the correction factor mark 22 of zero, as shown. Also, in this example the low electrolyte level mark 18 is aligned with the highest correction factor mark 24, for instance, of −0.048.

In practice, to determine the distance the electrolyte falls below the high mark, the observer, looking through the transparent wall 6a, aligns the electrolyte top surface line 30 with a first linear measuring indicia 12. To determine the appropriate correction factor for such level, the observer merely notes the second indicia 20 laterally opposite the first. If only the correction factor is required, the observer merely has to align the electrolyte top surface line 30 with the appropriate second linear measuring indicia 20. For example, FIG. 2 shows the distance between the high mark 14 and the electrolyte level to be one inch, and the corresponding specific gravity correction factor to be −0.024. To correct for variations among cells in multi-celled batteries, a scale 4, similar to that described above, may be provided on the wall adjacent each cell.

While the above description contains many specifications, these should not be construed as limitations on the scope of the invention, but rather as an exemplification of one preferred embodiment thereof. In particular, it should be noted that different values for each measuring indicia may be used in place of those shown. In addition, only the portion of the wall directly behind the scale need be transparent. It will be understood that these and other variations and modifications can be effected within the spirit and scope of the invention as previously described and as defined by the claims.

What I claim is:
1. A battery comprising:
   (a) a storage cell capable of containing electrolyte;
   (b) at least one transparent battery casing wall for allowing visual observation of the level of said electrolyte within said storage cell; and
   (c) a scale on said transparent wall for quantifying said observed electrolyte level; said scale comprising correction factor measuring indicia having predetermined values indicating a specific gravity correction factor for said observed electrolyte level.

2. The battery of claim 1, wherein said scale comprises measuring indicia having predetermined values for quantifying said observed electrolyte level, said indicia numbered in ascending order from a high electrolyte level mark to a low electrolyte level mark to indicate the distance said observed electrolyte level falls below said high level mark.

3. The battery of claim 2, further comprising correction factor measuring indicia having predetermined values indicating a specific gravity correction factor for said observed electrolyte level, and wherein said electrolyte level measuring indicia are laterally aligned with said correction factor measuring indicia having predetermined values correlating to said values of said electrolyte level measuring indicia.

4. The battery of claim 1, wherein said battery comprises a plurality of said storage cells each containing said scale.

* * * * *